Oct. 20, 1936.  C. D. McLAUGHLIN  2,057,900
MINE CAR AND LIKE VEHICLE
Filed May 6, 1935  4 Sheets-Sheet 1
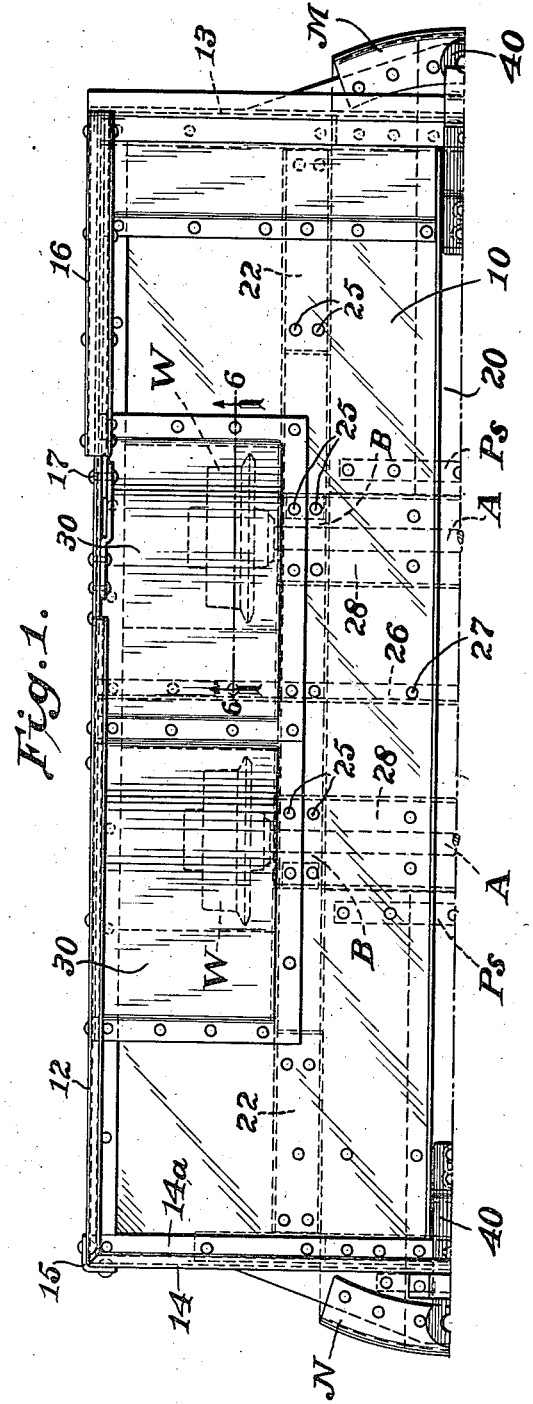
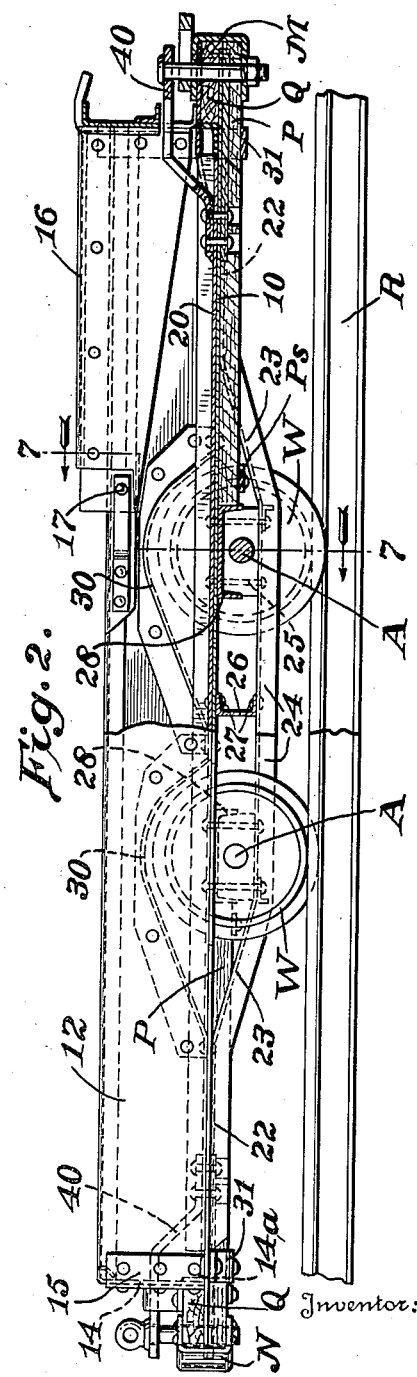
Inventor:
Clyde D. McLaughlin,
By
Attorneys Oct. 20, 1936.  C. D. McLAUGHLIN  2,057,900
MINE CAR AND LIKE VEHICLE
Filed May 6, 1935  4 Sheets-Sheet 2
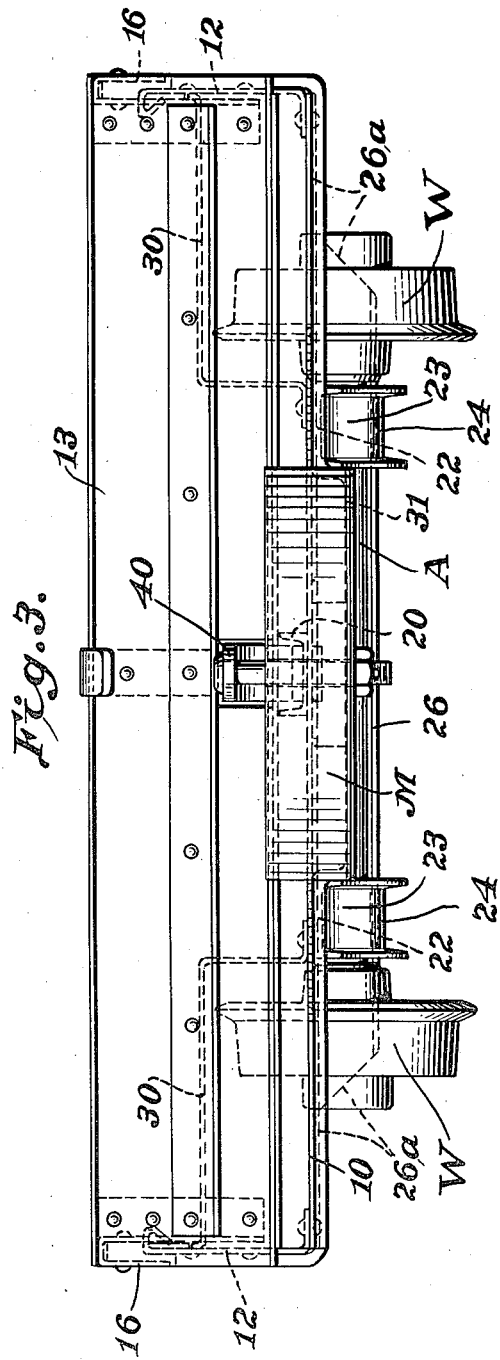
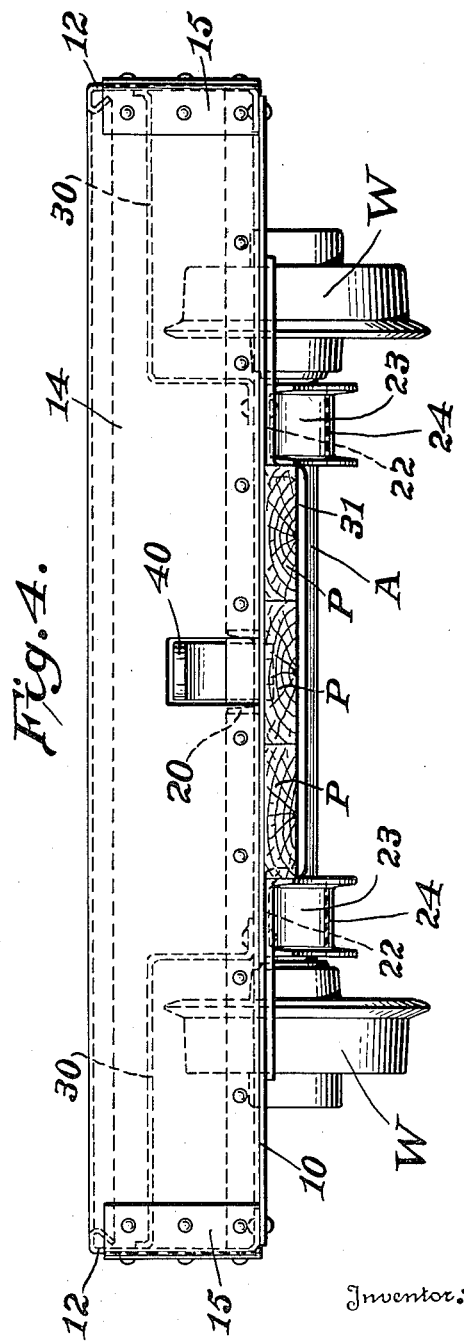
Inventor:
Clyde D. McLaughlin,
By
Attorneys.

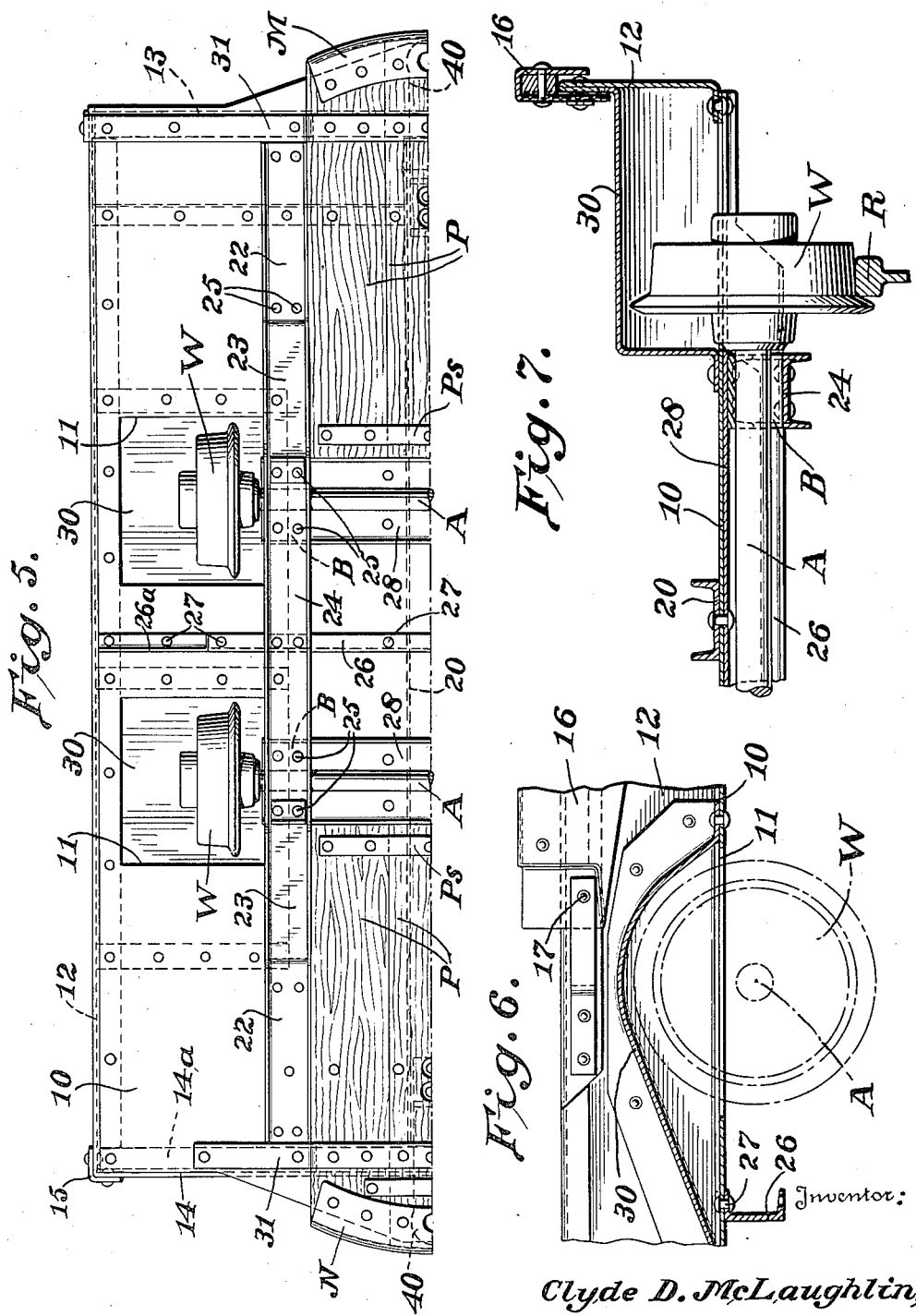

Oct. 20, 1936.  C. D. McLAUGHLIN  2,057,900
MINE CAR AND LIKE VEHICLE
Filed May 6, 1935  4 Sheets-Sheet 4
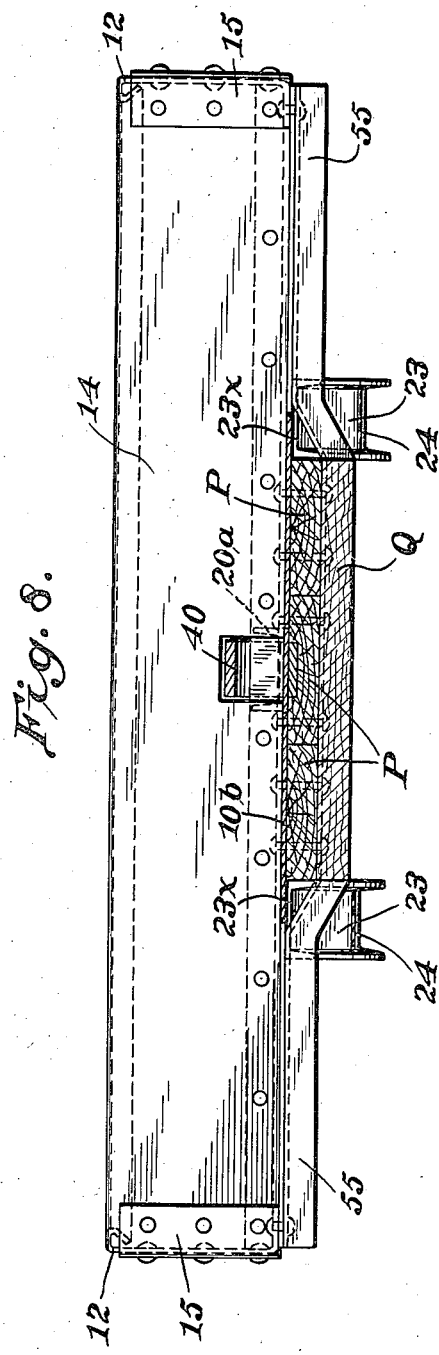
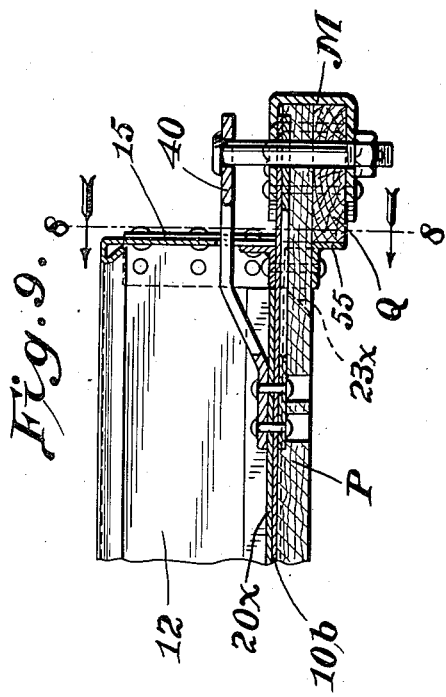
Inventor:
Clyde D. McLaughlin
By
Attorneys Patented Oct. 20, 1936

2,057,900

UNITED STATES PATENT OFFICE 2,057,900

MINE CAR AND LIKE VEHICLE

Clyde D. McLaughlin, Kettle Island, Ky., assignor to The Sanford Investment Company, Knoxville, Tenn., a corporation of Delaware Application May 6, 1935, Serial No. 20,108

11 Claims. (Cl. 105—364)

In vehicles of the type of mine cars, where it is essential to provide a structure capable of carrying a heavy load, and being itself of light weight and of limited dimensions corresponding to the permitted clearance along the right of way, it has been found difficult to devise a cheap and light assembly in which the lading body is adequately supported against end drooping.

According to the present invention, a girder-like construction is provided for the car sills, with utilization of standard shapes of angle members, the members being offset to give a greater resistance toward bending movement when assembled with the other parts of the car, by cooperation therewith to provide supporting girder means.

One of the features of the present invention therefore is the provision of a mine car or like vehicle having longitudinal sills comprised of angle members which at the ends of the vehicle are connected to parts of the vehicle body, and which are offset in a vertical plane adjacent their centers, and are secured to other parts of the car structure so that the car assembly as a whole presents a relatively deep girder in supporting relation to the lading.

A further feature of the present invention is the provision of longitudinal sills which are offset downwardly and pass beneath the axle boxings or supports, and at their ends are connected to portions of the car structure which extend substantially horizontally between such ends, whereby to provide a stiff girder structure.

A further feature of the present invention is the provision of a mine car or like vehicle in which a simple channel is formed by providing an offset central portion with transitions therefrom to end portions which are connected to other parts of the car structure, so that the channel provides part of a relatively deep girder for supporting the weight of the parts and lading.

Still another feature of the present invention is the provision of a mine car or like vehicle having a longitudinal sill structure which has offset portions spaced from a part of the vehicle bottom but connected thereto at the ends and having intermediate spacing members which maintain the spacing adjacent the center of the length of the sill member.

A still further feature of the present invention is the provision of a mine car or like vehicle having portions of its bottom extending above the axle boxings, and having longitudinal sill members which at the ends are connected to such bottom portions and which are offset downwardly adjacent the center of length of the vehicle and pass beneath and in supporting relation to the axle boxings.

A further feature of the present invention is the provision of such a vehicle with offset angle members employed as cantilever side sills and as transverse members for supporting the bottom and other parts of the vehicle.

With these and other features in view as objects of the invention, as will appear in the course of the following specification and claims, an illustrative form of practicing the invention is shown on the accompanying drawings, in which:

Fig. 1 is a top plan view of half of a mine car.

Fig. 2 is a side elevation of the same, with parts in longitudinal upright section.

Fig. 3 is an end view of one end of the complete car, on a somewhat larger scale.

Fig. 4 is a view of the other end, with bumper parts removed.

Fig. 5 is a bottom plan view of half of the car.

Fig. 6 is a detail view, on a larger scale and substantially on line 6—6 of Fig. 1.

Fig. 7 is a fragmentary transverse upright sectional view substantially on line 7—7 of Fig. 2.

Fig. 8 is a sectional view of another form of construction, substantially on line 8—8 of Fig. 9.

Fig. 9 is a longitudinal sectional view of the same.

In these drawings, the vehicle has wheels W for traveling on the rails R. The wheels are illustrated in Figs. 1 to 7 as rotatably supported on the axles A upon which in turn rest the axle supports or boxings B during the normal transit of the vehicle.

The lading body of the car includes a bottom sheet or floor 10 which is illustrated as extending from end to end and from side to side of the car. It is cut away adjacent the sides to provide spaces 11 for the reception of the wheels, which extend above the level of the bottom. The bottom sheet 10 is illustrated as having lateral portions extending from end to end to provide for connection to the inturned lower flanges of the side walls 12, and is connected by an angle iron 14a to one end wall 14. The vertical corners of the side walls 12 and the end wall 14 are connected and stiffened by corner members 15 which are rigidly fixed thereto. The end wall 13 is illustrated as providing a dump door so that the car may be employed for end dumping in the usual way, this end door 13 being supported by the side wings 16 which are connected by pivots 17 to the side walls 12.

The longitudinal sills are illustrated as comprising an inverted central channel 20 located above the bottom sheet 10 and the two longitudinal side sills of channel form which are located at a lower level than at least the lateral and end portions of the bottom sheet 10. These illustrated side sills each comprise the substantially horizontal end portions 22, the transition or downwardly inclined portions 23 and the depressed or offset horizontal central portions 24 which extend past the axles A. The sills are securely fastened to the bottom sheet 10. The ends 22 of the sills directly support the bottom sheet. The central portions 24 pass beneath the axle supports or boxings B and secure joining means such as rivets 25 connect these parts together and to the overlying portions of the bottom sheet 10.

In this illustrated form, the car is further reinforced transversely by providing an angle member 26 which is illustrated as a simple channel, and is located in the central upright transverse plane of the vehicle and is securely connected as by rivets 27 to the bottom sheet 10 and to the central portions 24 of the side sills, and also to the center sill 20. In the illustrated form, the projections of this transverse member 26 are cut away at 26a outside the lateral upright planes of the wheels, to afford clearance when such is demanded. Furthermore, angle members also illustrated as the simple channel sections 28 extend transversely above the axles A and closely fit the axle supports B, being interposed between the axle supports B and the floor sheet 10, and secured rigidly into the system by the rivets 25, and preferably also being connected to the center sill 20 and to the bottom sheet 10.

The gaps 11 in the bottom sheet 10 are illustrated as covered by hoods or covering pieces 30 of appropriate shape for extending over the wheels and for being secured to the bottom sheet 10 to close the same and to the adjacent side walls 12 to brace the side wall, and having inclined walls for deflecting the lading over and past the wheels during end dumping.

End bumpers and couplings M and N are provided, and are illustrated as including the upper draft elements 40 which extend through the end walls and are secured to the center sill 20 which thus serves for transmitting draft stresses while the vehicle is operating in a train. The bumper parts include the cushion planks P and Q, the planks P having their end grain presented against the inside of the bumper facing and extending inward beneath the bottom 10 and bearing against the angle members 28 to transmit bumping strains thereby to the car framing. These planks P are secured by the straps Ps and by the end belts 31.

Although in the illustrated form the axle boxings B are shown as of drop type for simple engagement with the axles A, it is obvious that other types may be employed.

The longitudinal sills, here also illustrated as channel members 23, each have substantially horizontal end portions 22 and the depressed portion 24 which extends beneath the axes of the wheels.

The end bumpers M and N here also include metal faces for receiving the shock and include flanges which are turned toward the center of length of the car and enclose the longer cushion planks or blocks P which are arranged with the grain running longitudinally of the car, and the shorter blocks Q which are illustrated as arranged with the grain running transversely of the car.

It will be noted from Fig. 8 that the pieces P in width correspond to the spacing between the side sills themselves. These structures are held in position by angle pieces 55 (Figs. 8 and 9) which operate as cantilevers in the transverse direction, being connected in supporting relation to the side bottom plates 10b, and being bent or deflected downwardly to pass beneath the bumper blocks P in resisting relation to the blocks Q. They thus serve to support the bumper pieces and to permit the use of the length of the blocks P for cushioning bumping shocks, along with the utilization of the transversely directed blocks Q for the same purpose. To this end, the side sills 23 are preferably terminated at 23x (Fig. 9) short of the angle members 55.

Similarly, the other illustrated phases of the particular form may be varied without departing from the scope of the invention as set out in the appended claims.

I claim:

1. A mine car or like vehicle comprising wheels and axles, longitudinal side sill-members having bends for providing bodily offset central portions, a bottom connected to said side sill-members, axle boxings for the axles secured to the sill-members in supporting relationship therewith, and transversely extending support means connected to said offset central portions and to the axle boxings and interposed in bracing relation between said offset central portions and the overlying parts of the bottom.

2. A mine car or like vehicle comprising wheels and axles, longitudinal side sill-members having offset central portions, a bottom connected to and located substantially in the plane of the end portions of the side sill-members and spaced from the sill-members at the central portions, said sill-members and bottom providing girder means in upright longitudinal planes, and axle boxings for the axles located and secured between the central portions and the said bottom and operating to stiffen the girder means formed by the side sill-members and bottom.

3. A mine car or like vehicle comprising wheels and axles, longitudinal sill-members having high horizontal end portions and downward bends providing bodily offset central portions located below the axles, at least one longitudinal member extending above the axles, transverse beam members connected to said longitudinal members, a car bottom secured to said members in supported relation, axle supports on said transverse beam members and located below said bottom, and walls connected to said members and bottom and providing a lading body.

4. A mine car or like vehicle comprising wheels and axles, longitudinal sill-members having bends providing downward bodily offset central portions located below the axles, axle supports resting on and secured to said offset portions, transverse channel structures extending above the axles and secured to said axle supports, a bottom resting on and secured to said sill-members at the ends thereof and extending over and connected to said transverse structures and having a portion extending laterally between the wheels, and a further transverse member located above said offset portions and secured thereto and to said bottom and extending laterally beneath said bottom portion for supporting the same.

5. In a mine car or like vehicle having wheels and axles, longitudinal sill-members; said members including central portions offset downwardly bodily and located below the axles and extending from axle to axle, end portions located above the central portions, and transition portions sloping downwardly from the end portions to the central portions; axle supports on said central portions, and a bottom connected to said end portions and including parts extending laterally past the wheels, and transverse members interposed between the said central portions and bottom for supporting the bottom.

6. A mine car or like vehicle comprising wheels and axles, longitudinal side sill-members having offset central portions, a bottom connected to said side sill-members at their ends, axle boxings for said axles mounted on top of and secured to the sill-members, and a transverse member located below and connected in supporting relation to said bottom and extending from axle boxing to axle boxing and secured to the same for transversely bracing the sill-members and boxings and for transferring the load on the bottom to said sill-members.

7. A mine car or like vehicle comprising wheels and axles, a lading body having a lading bottom located entirely above the horizontal plane of the wheel axes and extending laterally beyond the wheel gauge lines at both sides of the body, axle boxings located laterally inside the wheels, longitudinal sill-members supporting the lading bottom and located laterally inside the wheels and below the lading bottom, said sill-members being bent downwardly and passing underneath the axle boxings and being attached thereto in supporting fashion.

8. A mine car or like vehicle comprising wheels and axles, a lading body having a lading bottom located entirely above the horizontal plane of the wheel axes and extending laterally beyond the wheel gauge lines at both sides of the body in planes which intersect the wheels, axle boxings located laterally inside the wheels, longitudinal sill-members supporting the lading bottom and located laterally inside the wheels and below the lading bottom, said sill-members being bent downwardly and passing underneath the axle boxings and being attached thereto in supporting fashion.

9. In a wheeled vehicle, the combination of a lading body having a lading bottom located entirely above the horizontal plane of the wheel axes, axles for the wheels, axle boxings below the lading bottom, and longitudinal sill-members passing underneath the axle boxings and rising at their ends to engage the lower surface of the lading bottom at a level above the horizontal plane of the wheel axes.

10. In a four-wheel mine car, the combination of a lading body having a lading bottom located entirely above the horizontal plane of the wheel axes and said lading bottom extending laterally beyond the wheel gauge lines at both sides of the car in planes that intersect the wheels, axles for the wheels, axle boxings located laterally inside the wheels, longitudinal angle-form supporting members for the car bottom located below said bottom and laterally inside the wheels, said angle-form members having bends so that they pass bodily underneath the axle boxings and rise at their ends to engage the lower surfaces of the lading bottom.

11. In a mine or similar rail car, the combination of a lading body having a lading bottom, wheels and axles, longitudinal load supporting sill-members extending substantially from end to end of the lading bottom; each said sill-member having bends providing a portion adjacent its center of length whose top surface is horizontal and located below the level of the axles, portions near the ends of each said sill-member having top surfaces which are horizontal and located above the level of the axles, and still other portions providing transitions from the end portions to the central portions; and means for connecting the axles to the underlying central portions.

CLYDE D. McLAUGHLIN.